United States Patent
Stallinga

(10) Patent No.: US 7,616,536 B2
(45) Date of Patent: Nov. 10, 2009

(54) APPARATUS FOR RADIAL TRACKING IN AN OPTICAL DISC DRIVE USING TRACKING AN ERROR SIGNAL DERIVED FROM WOBBLE-INDUCED SIGNAL COMPONENTS AND/OR DATA-INDUCED SIGNAL COMPONENTS OF A DETECTOR OUTPUT

(75) Inventor: Sjoerd Stallinga, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 413 days.

(21) Appl. No.: 10/557,636

(22) PCT Filed: May 13, 2004

(86) PCT No.: PCT/IB2004/050683
§ 371 (c)(1),
(2), (4) Date: Nov. 17, 2005

(87) PCT Pub. No.: WO2004/105002
PCT Pub. Date: Dec. 2, 2004

(65) Prior Publication Data
US 2007/0201325 A1    Aug. 30, 2007

(30) Foreign Application Priority Data
May 21, 2003    (EP) .................................. 03101446

(51) Int. Cl.
*G11B 7/00* (2006.01)
(52) U.S. Cl. .............. 369/44.29; 369/44.13; 369/44.27; 369/44.35
(58) Field of Classification Search ............. 369/44.13, 369/44.27, 44.29, 44.35, 453.28, 53.31
See application file for complete search history.

(56) References Cited

U.S. PATENT DOCUMENTS

| | | | | |
|---|---|---|---|---|
| 4,661,944 A | * | 4/1987 | Van Sluys | ................. 369/44.23 |
| 4,847,708 A | * | 7/1989 | Furuyama | ................. 369/30.12 |
| 5,303,216 A | | 4/1994 | Shinoda et al. | |
| 5,835,459 A | * | 11/1998 | Takahara et al. | .......... 369/44.28 |
| 5,859,830 A | * | 1/1999 | Eastman et al. | .......... 369/44.13 |
| 6,057,548 A | * | 5/2000 | Schatzberg | .............. 250/317.1 |
| 6,222,340 B1 | * | 4/2001 | Kawabata et al. | ........... 318/685 |
| 6,317,394 B2 | * | 11/2001 | Ohshita et al. | ........... 369/44.28 |

(Continued)

FOREIGN PATENT DOCUMENTS

JP    2001134960    5/2001

(Continued)

*Primary Examiner*—Wayne R Young
*Assistant Examiner*—La Tanya Bibbins

(57) ABSTRACT

An optical disc drive uses a tracking error signal derived from the wobble-induced signal components of the optical detector signal. This tracking error signal is relatively insensitive to beamlanding errors, and to differences in the signal amplitudes of the output signal of individual detector segments. Further, the need for a 3-spot grating is eliminated. A distinction is made between a situation where the track being followed is empty, and a situation where the track being followed is written. In case the track being followed is empty, a tracking error signal is derived from the wobble-induced signal components of the optical detector signal, whereas, in case the track being followed is written, a tracking error signal is derived from the data-induced signal components of the optical detector signal.

12 Claims, 7 Drawing Sheets

U.S. PATENT DOCUMENTS

| | | |
|---|---|---|
| 6,388,964 B2 | 5/2002 | Watabe |
| 6,657,930 B1 | 12/2003 | Nomoto |
| 6,879,549 B2 * | 4/2005 | Kim et al. ................ 369/30.17 |
| 2001/0010667 A1 | 8/2001 | Nakajo |
| 2001/0040861 A1 | 11/2001 | Aoki |
| 2002/0039331 A1 | 4/2002 | Park |
| 2002/0080700 A1 * | 6/2002 | Watanabe et al. ........ 369/53.22 |
| 2002/0138161 A1 * | 9/2002 | Kim ............................ 700/56 |

FOREIGN PATENT DOCUMENTS

| | | |
|---|---|---|
| WO | 98/49679 A2 | 11/1998 |
| WO | 2004/105002 A1 | 12/2004 |

* cited by examiner

APPARATUS FOR RADIAL TRACKING IN AN OPTICAL DISC DRIVE USING TRACKING AN ERROR SIGNAL DERIVED FROM WOBBLE-INDUCED SIGNAL COMPONENTS AND/OR DATA-INDUCED SIGNAL COMPONENTS OF A DETECTOR OUTPUT

FIELD OF THE INVENTION

The present invention relates in general to a disc drive apparatus for writing/reading information into/from an optical storage disc; hereinafter, such disc drive apparatus will also be indicated as "optical disc drive".

BACKGROUND OF THE INVENTION

As is commonly known to persons skilled in the art, an optical storage disc comprises at least one track, either in the form of a continuous spiral or in the form of multiple concentric circles, of storage space where information may be stored in the form of a data pattern.

For writing information into the storage space of the optical storage disc, or for reading information from the disc, an optical disc drive comprises, on the one hand, rotating means for receiving and rotating an optical disc, and on the other hand optical means for generating an optical beam, typically a laser beam, and for scanning the storage track with said laser beam.

For optically scanning the rotating disc, an optical disc drive comprises a light beam generator device (typically a laser diode), an objective lens for focussing the light beam into a focal spot on the disc, and an optical detector for receiving the reflected light reflected from the disc and for generating an electrical detector output signal.

During operation, the focal spot should remain aligned with a track or should be capable of being positioned with respect to a new track. To this end, at least the objective lens is mounted radially displaceable, and the optical disc drive comprises radial actuator means for controlling the radial position of the objective lens.

The electrical detector output signal contains information on the tracking error, i.e. the radial distance from the centre of the focal spot to the centre of the track being followed. This electrical detector output signal is received by a control circuit, which processes the electrical detector output signal in order to generate a control circuit for the radial actuator.

One well-known method to process the electrical detector output signal is to generate a push/pull signal. The push/pull method has some disadvantages.

One disadvantage of the push/pull method is the sensitivity to beamlanding errors, i.e. a displacement of the light spot with respect to the optical detector.

A well-known solution to this problem is the three-spot push/pull method. Although the three-spot push/pull method solves the beamlanding-sensitivity problem of the one-spot push/pull method, it introduces other disadvantages. For one, it is necessary to use hardware equipment for generating three spots, i.e. a three-spot grating, which also needs to be aligned; this adds to the complexity and costs of the optical system. Further, a three-spot grating effectively splits one laser beam into three, namely one main beam and two auxiliary beams, resulting in a reduced light intensity of the main beam.

U.S. Pat. No. 6,388,964 discloses a tracking method where a tracking error signal is generated from the detector output signal on the basis of a differential phase detection method. The method as described in this document applies to ROM-drives, i.e. applies to discs containing data. This means that the method as disclosed in said document can not be applied directly in a drive suitable for handling writable discs, because writable discs may have tracks without data.

SUMMARY OF THE INVENTION

It is a general purpose of the present invention to provide a new radial tracking method as alternative to the push/pull tracking methods. Specifically, the present invention aims to provide a radial tracking method which can be used as an alternative to the three-spot push/pull method, having the advantages of the three-spot push/pull method without having the disadvantages thereof.

Particularly, the present invention aims to provide a radial tracking method which is less sensitive, ideally insensitive, to beamlanding errors.

Further, the present invention aims to provide a radial tracking method which can be implemented with a simplified optical system without the need for a three-spot grating.

Further, the present invention aims to provide a radial tracking method which can be applied to discs having tracks without data.

According to an important aspect of the present invention, a tracking error signal is generated on the basis of a wobble signal. Thus, the method of the present invention can be applied in all cases of writable discs which have a wobbled pre-groove. The wobble signal is available even if the track is empty.

It may be that, in practice, the tracking method is affected disadvantageously if the track is not empty, i.e. if the track contains data. In such case, according to a further important aspect of the present invention, a tracking error signal is preferably generated on the basis of a data signal.

BRIEF DESCRIPTION OF THE DRAWINGS

These and other aspects, features and advantages of the present invention will be further explained by the following description of a preferred embodiment of a disc drive apparatus according to the present invention with reference to the drawings, in which same reference numerals indicate same or similar parts, and in which.

DESCRIPTION OF THE INVENTION

Figure 1:
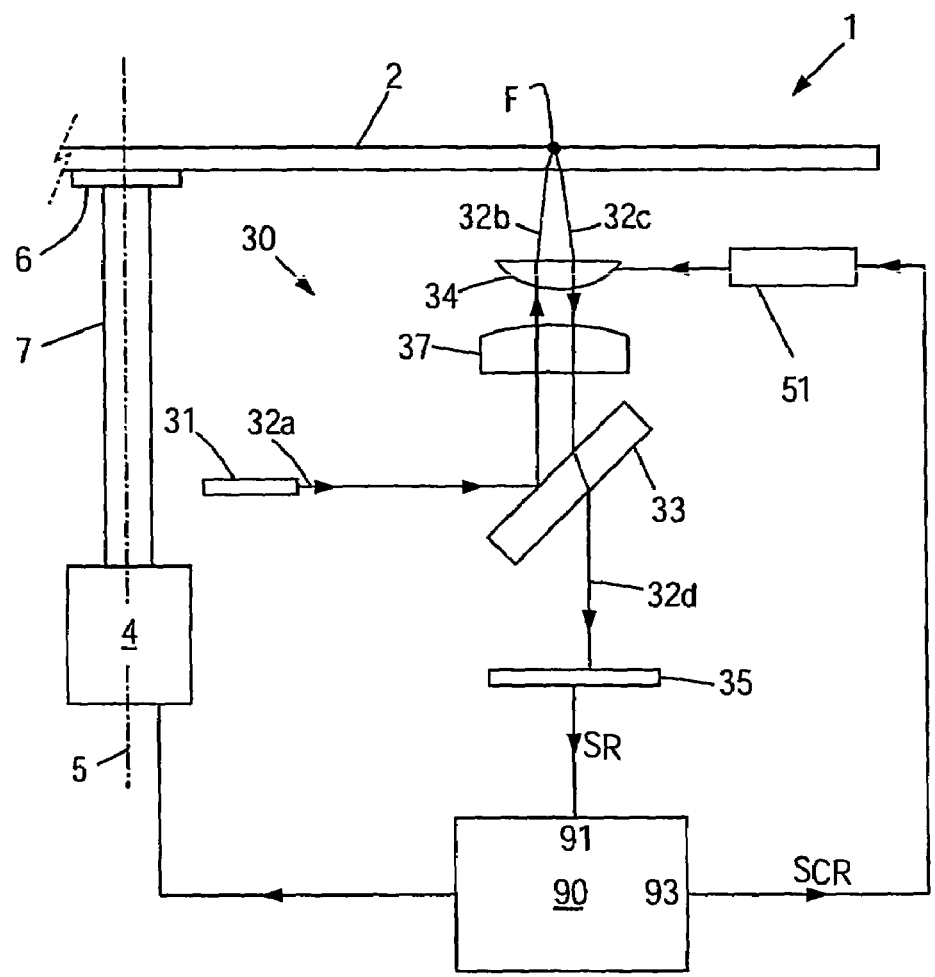
FIG. 1 schematically illustrates an optical disc drive apparatus.

FIG. 1 schematically illustrates an optical disc drive apparatus 1, suitable for storing information on or reading information from an optical storage disc 2, typically a DVD or a CD or a BD (Bluray Disc). The optical disc 2 comprises at least one track, either in the form of a continuous spiral or in the form of multiple concentric circles, of storage space where information may be stored in the form of a data pattern. The optical disc may be read-only type, where information is recorded during manufacturing, which information can only be read by a user. The optical disc may also be a recordable (R) or rewritable (RW) type, where information may be stored by a user. Recordable discs are write-once discs, where information can only be written once, whereas rewritable discs are write-many discs, where the information contents can be changed by writing over previously written data.

The present invention relates particularly to writable discs, indicated as R/RW discs, and thus relates particularly to R/RW disc drives, i.e. disc drives capable of reading and/or writing R/RW discs; examples of such discs are: CD-R, CD-RW, DVD-RW, DVD+RW, DVD+R, BD+RW. Therefore, the present invention will hereinafter specifically be explained for R/RW disc drives. However, it is explicitly noted that the reference to R/RW disc drives is by way of example only, and that it is not intended to restrict the scope of the present invention in any way to such example, because the gist of the present invention is also applicable to read-only discs. Particularly, the present invention is applicable to disc drives which are only capable of reading discs, whether it be a writable disc or not. Also, the present invention is applicable to disc drives which are only capable of reading read-only discs.

Since the technology of optical discs in general, the way in which information can be stored in an optical disc, and the way in which optical data can be read from an optical disc, is commonly known to persons skilled in this art, it is not necessary here to describe this technology in more detail.

For rotating the disc 2, the disc drive apparatus 1 comprises a motor 4 fixed to a frame (not shown for sake of simplicity), defining a rotation axis 5. For receiving and holding the disc 2, the disc drive apparatus 1 may comprise a turntable or clamping hub 6, which in the case of a spindle motor 4 is mounted on the spindle axle 7 of the motor 4.

The disc drive apparatus 1 further comprises an optical system 30 for scanning tracks of the disc 2 with an optical beam. The optical system 30 comprises a light beam generating means 31, typically a laser such as a laser diode, arranged to generate a light beam 32. In the following, different sections of the optical path of the light beam 32 will be indicated by a character a, b, c, etc added to the reference numeral 32.

The light beam 32 passes a beam splitter 33, a collimator lens 37 and an objective lens 34 to reach (beam 32*b*) the disc 2. The light beam 32*b* reflects from the disc 2 (reflected light beam 32*c*) and passes the objective lens 34, the collimator lens 37 and the beam splitter 33 (beam 32*d*) to reach an optical detector 35.

The objective lens 34 is designed to focus the light beam 32*b* in a focal spot F on an information layer (not shown for sake of simplicity) of the disc 2.

During operation, the focal spot should remain aligned with a track or should be capable of being positioned with respect to a new track. To this end, at least the objective lens 34 is arranged radially displaceable, and the optical disc drive apparatus 1 comprises a radial actuator 51 arranged for radially displacing the objective lens 34 with respect to the disc 2. Since radial actuators are known per se, while further the design and operation of such radial actuator is no subject of the present invention, it is not necessary here to discuss the design and operation of such radial actuator in great detail.

The disc drive apparatus 1 further comprises a control circuit 90 having an output 93 coupled to a control input of the radial actuator 51, and a read signal input 91 for receiving a read signal $S_R$ from the optical detector 35. The control circuit 90 is designed to generate at its output 93 a control signal $S_{CR}$ for controlling the radial actuator 51.

Figure 2:
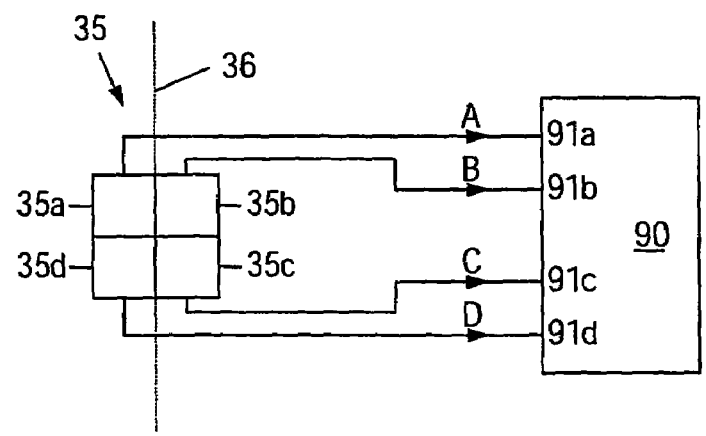
FIG. 2 schematically illustrates an optical detector in more detail.

FIG. 2 illustrates that the optical detector 35 comprises a plurality of detector segments, in this case four detector segments 35*a*, 35*b*, 35*c*, 35*d*, capable of providing individual detector signals A, B, C, D, respectively, indicating the amount of light incident on each of the four detector quadrants, respectively. A centre line 36, separating the first and fourth segments 35*a* and 35*d* from the second and third segments 35*b* and 35*c*, has a direction corresponding to the track direction. Since such four-quadrant detector is commonly known per se, it is not necessary here to give a more detailed description of its design and functioning.

FIG. 2 also illustrates that the read signal input 91 of the control circuit 90 actually comprises four inputs 91*a*, 91*b*, 91*c*, 91*d* for receiving said individual detector signals A, B, C, D, respectively. The control circuit 90 is designed to process said individual detector signals A, B, C, D, in order to derive data and control information therefrom, as will be clear to a person skilled in the art. For instance, a data signal $S_D$ can be obtained by summation of all individual detector signals A, B, C, D according to $$S_D = A+B+C+D \tag{1}$$

Further, a push-pull tracking error signal $S_{TE}$ can be obtained by summation of the signals A and D from all individual detector segments 35*a* and 35*d* on one side of the centre line 36, summation of the signals B and C from all individual detector segments 35*b* and 35*c* on the other side of the centre line 36, and taking the difference of these two summations, according to $$S_{TE} = (A+D)-(B+C) \tag{2a}$$

In order to compensate light intensity variations of the beam as a whole, this error signal can be normalised by division by the data signal to obtain a normalised tracking error signal RES, according to $$RES = S_{TE}/S_D \tag{2b}$$

In a case of a disc having tracks in the form of wobbled pregrooves, as is known per se, the four signals A, B, C, D will contain a signal component having a frequency equal to the linear scanning speed divided by the wobble period. This frequency is the same for all four signals A, B, C, D, but in general the four oscillations are not in phase.

The wobble-induced signal components will be indicated as $W_A$, $W_B$, $W_C$, $W_D$, respectively, and can mathematically be written as $$W_A = K_A \cdot \cos(\tau - \tau_A) \tag{3a}$$

$$W_B = K_B \cdot \cos(\tau - \tau_B) \tag{3b}$$

$$W_C = K_C \cdot \cos(\tau - \tau_C) \tag{3c}$$

$$W_D = K_D \cdot \cos(\tau - \tau_D) \tag{3d}$$

wherein $K_A$, $K_B$, $K_C$, $K_D$ are the respective amplitudes and wherein $\tau_A$, $\tau_B$, $\tau_C$, $\tau_D$ are the respective phases.

$\tau = 2\pi x/1_w$ is the tangential scanning variable, wherein x represents the track distance travelled by the beam 32, and wherein $1_w$ represents the wobble period.

It can be shown that the respective phases depend on the radial scanning variable $\phi = 2\pi y/t_P$, wherein $t_P$ represents track pitch, and wherein y represent the radial error, i.e. the radial distance between the centre of the spot and the centre of the track.

For any pair of signals P, Q (P and Q representing A, B, C, D), the mutual delay $\Delta(P,Q)$ can be defined as $$\Delta(P,Q)=\tau_P-\tau_Q \quad (4)$$

A preferred suitable tracking error signal derived from the wobble-induced signal components is defined as $$DTD4R=\Delta(A,B)+\Delta(C,D) \quad (5)$$

Figure 3:
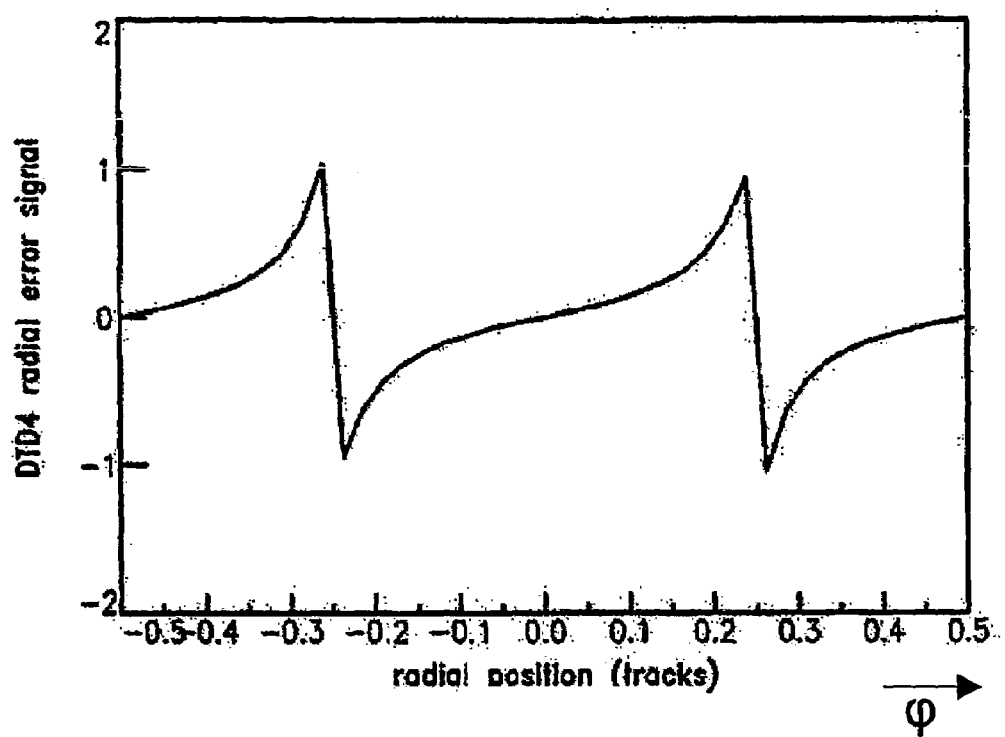
FIG. 3 is a graph illustrating a DTD error signal as a function of the radial scanning variable.

FIG. 3 is a graph showing this preferred tracking error signal DTD4R obtained by a numerical simulation with DVD+RW pregroove parameters. The horizontal axis represents the radial scanning variable $\phi$, while the vertical axis represent DTD4R. It can be seen from FIG. 3 that DTD4R is proportional to $\phi$ in a range of $\phi$ around zero, so that DTD4R can indeed be used as tracking error signal.

It is noted that in the simulation it was assumed that two neighbouring tracks have their respective wobbles mutually in phase. Normally, this will not be the case in practice, which may lead to a different shape of the error signal DTD4R. Nevertheless, in a range of $\phi$ around zero, DTD4R remains proportional to $\phi$ to a good approximation, so that DTD4R can still be used as tracking error signal.

The DTD4R signal as defined by formula 5 is not the only signal potentially capable of functioning as tracking error signal. In an alternative embodiment, a signal DTD4T is used, defined as $$DTD4T=\Delta(A,D)+\Delta(C,B) \quad (6)$$

However, when comparing the DTD4R and DTD4T signals, the DTD4R signal is preferred because it introduces less noise in the final error signal than the DTD4T signal.

In another alternative embodiment, a signal DTD2 is used, defined as $$DTD2=\Delta(A+C,B+D) \quad (7)$$

However, when comparing the DTD4R and DTD2 signals, the DTD4R signal is preferred because it introduces less noise in the final error signal than the DTD2 signal. Further, the DTD2 signal is more sensitive to beamlanding errors.

The method as described above, i.e. the use of a wobble-derived signal as tracking error signal, works well if a track is empty, i.e. for a track which does not contain any data written in it. If, however, a track does contain data, the data introduce noise into such wobble-derived signal. In order to eliminate or at least reduce this noise, it is possible to use, at the control circuit input, a suitable filter which is designed to pass a frequency range comprising a signal component useable as tracking error signal, and to stop a frequency range comprising the disadvantageous noise components; indeed such an embodiment is an embodiment within the scope of the present invention.

However, if a track does contain data, it is preferred as tracking error signal to use a signal derived from the data signal. Then, the wobble-derived signal becomes an undesired signal component, which can be eliminated or at least reduced by using a suitable filter which is designed to pass a frequency range comprising a data signal component useable as tracking error signal, and to stop a frequency range comprising the wobble-derived signal.

Thus, in order to be able to handle a disc which contains written tracks as well as virgin tracks, it is desirable to use a controllable filter device which is capable of being controlled to have a first filter characteristic suitable for use in the case of a written track and capable of being controlled to have a second filter characteristic suitable for use in the case of a virgin track.

Figure 4:
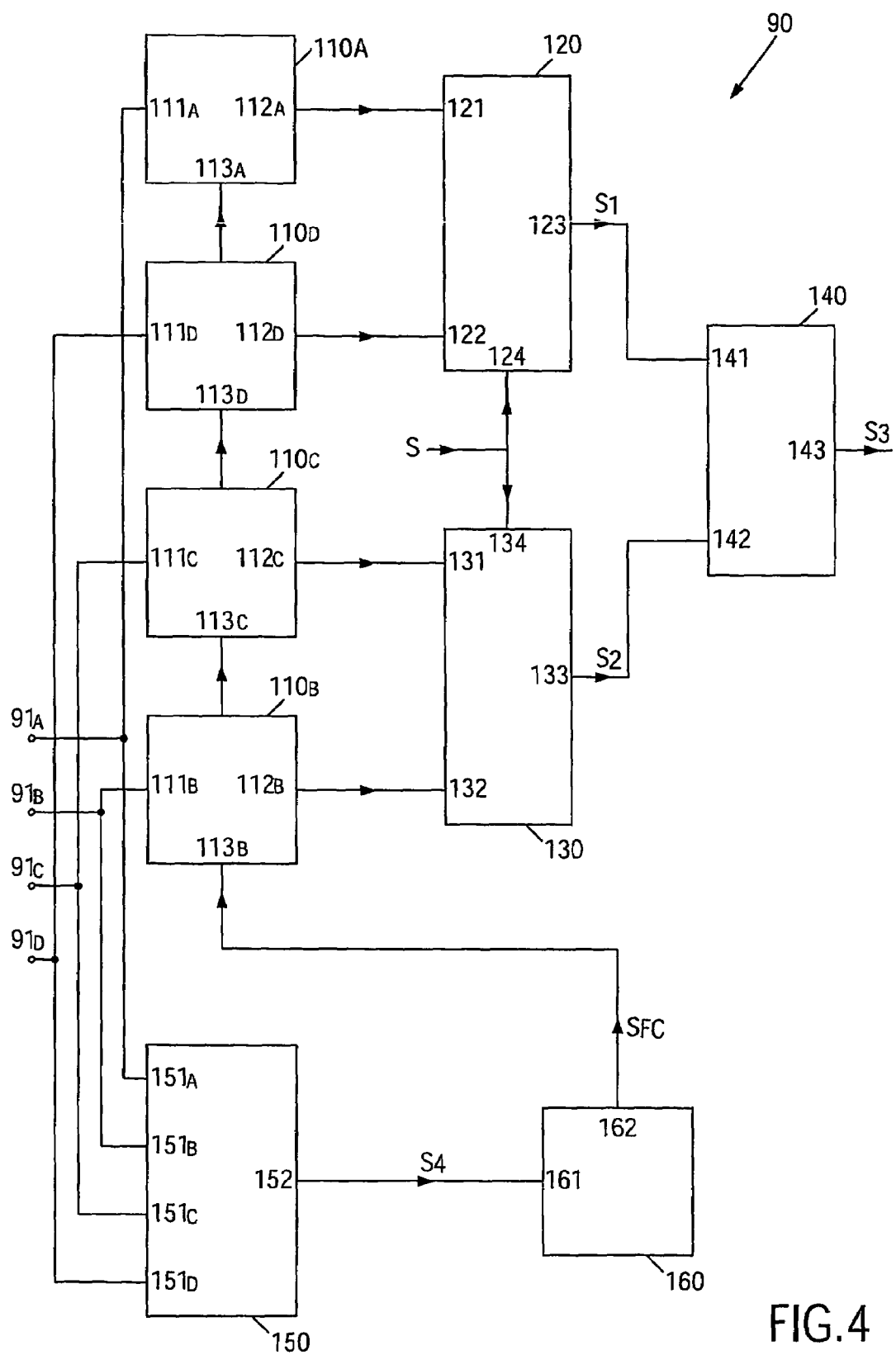
FIG. 4 is a block diagram illustrating relevant components of a control circuit.

FIG. 4 is a block diagram schematically showing relevant components of a disc drive according to a preferred embodiment of the invention. In this embodiment, the control circuit 90 comprises four controllable filter devices 110A, 110B, 110C, 110D, having respective outputs 112A, 112B, 112C, 112D, and having respective inputs 111A, 111B, 111C, 111D coupled to the respective signal inputs 91A, 91B, 91C, 91D of the control circuit 90. Further, the control circuit 90 comprises two delay calculators 120 and 130, having respective outputs 123 and 133.

The first delay calculator 120 has a first input 121 coupled to the output 112A of the first controllable filter device 110A, and has a second input 122 coupled to the output 112d of the fourth controllable filter device 110D. At its output 123, the first delay calculator 120 provides a signal S1 representing the delay $\Delta(A,D)$ between the signals A and D of the first and fourth detector segments 35a and 35d, respectively.

The second delay calculator 130 has a first input 131 coupled to the output 112C of the third controllable filter device 110C, and has a second input 132 coupled to the output 112B of the fourth controllable filter device 110B. At its output 133, the second delay calculator 130 provides a signal S2 representing the delay $\Delta(B,C)$ between the signals B and C of the second and third detector segments 35b and 35c, respectively.

Further, the control circuit 90 comprises a first adder 140, having an output 143. The first adder 140 has a first input 141 coupled to the output 123 of the first delay calculator 120, and has a second input 142 coupled to the output 133 of the second delay calculator 130. At its output 143, the first adder 140 provides a signal S3 representing the DTD4R signal.

Further, the control circuit 90 comprises a second adder 150, having four inputs 151A, 151B, 151C, 151D coupled to the respective signal inputs 91A, 91B, 91C, 91D of the control circuit 90. At an output 152, the second adder 150 provides a signal S4 representing the central aperture signal CA of the optical detector 35, i.e. the sum signal of the four detector quadrants. Further, the control circuit 90 comprises a filter controller 160, having an input 161 coupled to receive the output signal S4 of the second adder 150. The filter controller 160 has an output 162, coupled to respective control inputs 113A, 113B, 113C, 113D of the controllable filters 110A, 110B, 110C, 110D.

Alternatively, the filter controller 160 may have four separate outputs, each coupled to the respective control inputs of the controllable filters 110A, 110B, 110C, 110D.

Figure 5B:
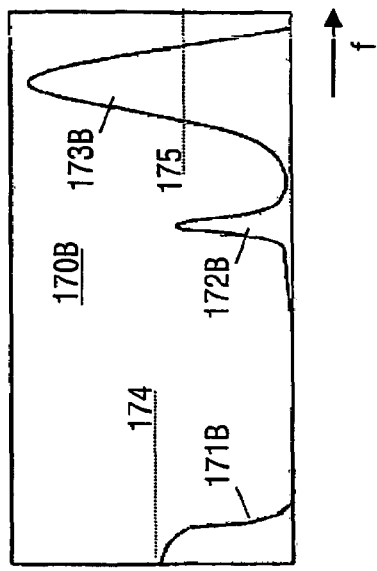
FIGS. 5A and 5B are graphs illustrating a frequency spectrum of a detector output signal.
Figure 5A:
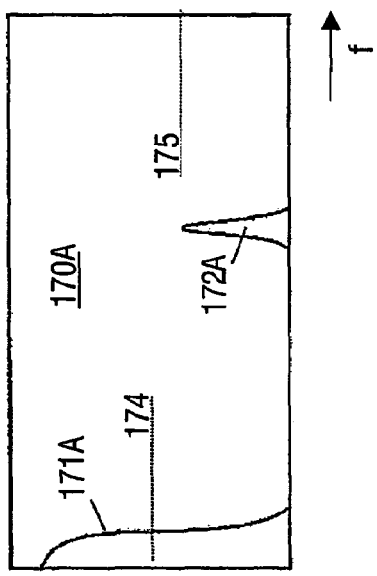

The filter controller 160 is designed to evaluate its input signal to determine whether or not the current track contains data. In a suitable embodiment, this is done on the basis of the frequency spectrum of this signal. FIG. 5A is a graph schematically illustrating the shape of the frequency spectrum 170A of the central aperture signal CA for the case of an unwritten track, while FIG. 5B is a similar graph showing the frequency spectrum 170B of the central aperture signal CA for the case of a written track. In both cases, the horizontal axis represents frequency in arbitrary units and the vertical axis represents signal power in arbitrary units.

It is noted that these graphs are only showing idealized contours of the frequency spectrum, for illustrating some qualitative aspects in general. In reality, such spectra have a more complicated shape, as will be understood by persons skilled in this art.

In the following, the index A and B, respectively, to a reference numeral will be used to specify the case of an unwritten track and the case of a written track, respectively, whereas the reference numeral without such index will be used to indicate the corresponding feature in any case.

When comparing FIGS. 5A and 5B, it can be seen that the frequency spectrum 170 always contains a first significant peak 171 in a low frequency range of approximately 0 to 100 or 1000 Hz. This peak 171 will be indicated by the phrase "DC-peak". Further, it can be seen that the height of the DC-peak 171B for the case of a written track is significantly lower than the height of the DC-peak 171A for the case of an unwritten track.

Further, the frequency spectrum 170 always contains a second significant peak 172 in a range around the wobble frequency, which typically is in the range of 1 MHz in case of a 1X DVD+RW system. This peak 172 will be indicated by the phrase "wobble-peak". When comparing FIGS. 5A and 5B, it can be seen that the height of the wobble-peak 172 is substantially unaffected by the presence or absence of data.

Further, in the case of a written track, the frequency spectrum 170B contains a third significant peak 173B in the range corresponding to data frequencies, typically in the range of 1-10 MHz in case of a 1X DVD+RW system. This third significant peak will be indicated by the phrase "data-peak". Since an unwritten track does not contain data, the first frequency spectrum 170A does not contain such data-peak.

The filter controller 160 may be designed to use any of the above-mentioned, or possible other, differences to decide whether or not the current track contains data, and to generate at its output 162 a filter control signal $S_{FC}$ of which the value depends on the outcome of this decision such as to switch the filter characteristics of the controllable filters 110. For instance the filter control signal $S_{FC}$ may have a first value (e.g. a high level or a digital "1") if the filter controller 160 finds that data is present, and it may have a second value (e.g. a low level or a digital "0") if the filter controller 160 finds that data is not present.

In one embodiment, the filter controller 160 may be designed to monitor the DC-peak 171 of the CA-signal (or more precisely: to measure the signal power in a low frequency range), and to compare the height of the DC-peak 171 with a predetermined reference level, indicated at 174 in FIGS. 5A and 5B. If the measured height is above this predetermined reference level, the filter controller 160 decides that data is absent, whereas if the measured height is below this predetermined reference level, the filter controller 160 decides that data is present.

In a second embodiment, the filter controller 160 may be designed to monitor the data-peak 173 (or more precisely: to measure the signal power in the frequency range corresponding to data frequencies), and to compare the height of the data-peak 173 with a predetermined reference level, indicated at 175 in FIGS. 5A and 5B. If the measured height is above this predetermined reference level, the filter controller 160 decides that data is present, whereas if the measured height is below this predetermined reference level, the filter controller 160 decides that data is absent.

Figure 5C:
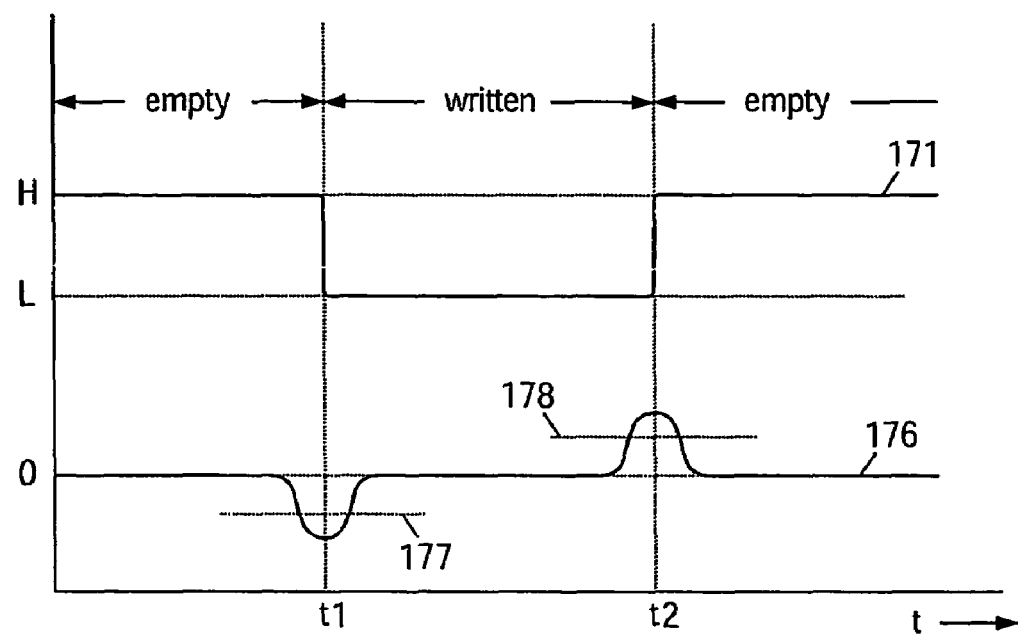
FIG. 5C is a graph illustrating the behaviour of a characteristic feature of the detector output signal as a function of time.

The above two embodiments have the characteristic that at any time the filter controller 160 finds the current status of the track: YES DATA or NO DATA. However, a difficulty may be to define a suitable value for the reference level, especially in the first embodiment. In an alternative embodiment, based on the same principles as the first embodiment, the filter controller 160 again is designed to monitor the DC-peak 171 of the CA-signal, but, instead of comparing the current height of the DC-peak 171 with a predetermined reference level, the filter controller 160 monitors variations of the DC-peak 171. FIG. 5C is a time diagram, illustrating an example of changes in the height of the DC-peak 171 as a function of time (top graph). Starting at the left, the height of the DC-peak 171 remains substantially constant at a first level H, until time t1, when the height of the DC-peak 171 suddenly drops significantly to a lower level L. The filter controller 160 may take such drop as indicating a transition from an empty track to a written track.

After the drop at time t1, the height of the DC-peak 171 remains substantially constant again at said lower level L, until time t2, when the height of the DC-peak 171 suddenly rises significantly to the higher level H. The filter controller 160 may take such rise as indicating a transition from a written track to an empty track.

It is also possible that the filter controller 160 is designed to calculate a time-derivative of the DC-peak 171, indicated as lower graph 176 in FIG. 5C. Normally, this time-derivative 176 is substantially equal to zero. Only at the transition moments t1 and t2, this time-derivative 176 shows a negative and a positive peak, respectively. For using this signal, the filter controller 160 may be designed to compare the value of this time-derivative with predetermined negative and positive threshold levels, indicated at 177 and 178 in FIG. 5C. As long as the magnitude of this time-derivative is below such threshold, a current status is maintained. If the magnitude of this time-derivative exceeds any said predetermined threshold levels, the filter controller 160 may take such event as indicating a transition from a written track portion to an unwritten track portion (if the magnitude of the time-derivative exceeds the negative threshold level 177) or a transition from an unwritten track portion to a written track portion (if the magnitude of the time-derivative exceeds the positive threshold level 178).

Alternatively, instead of the DC-peak 171, the filter controller 160 may use the data-peak 173 for finding sudden drops and rises, of for calculating a time-derivative and to find peaks in such time derivatives. It should be clear that, in this case, a transition from an unwritten track portion to a written track portion is associated with a rise of the data-peak 173 and with a time-derivative exceeding a positive threshold level, while a transition from a written track portion to an unwritten track portion is associated with a drop of the data-peak 173 and with a time-derivative exceeding a negative threshold level.

Figure 6:
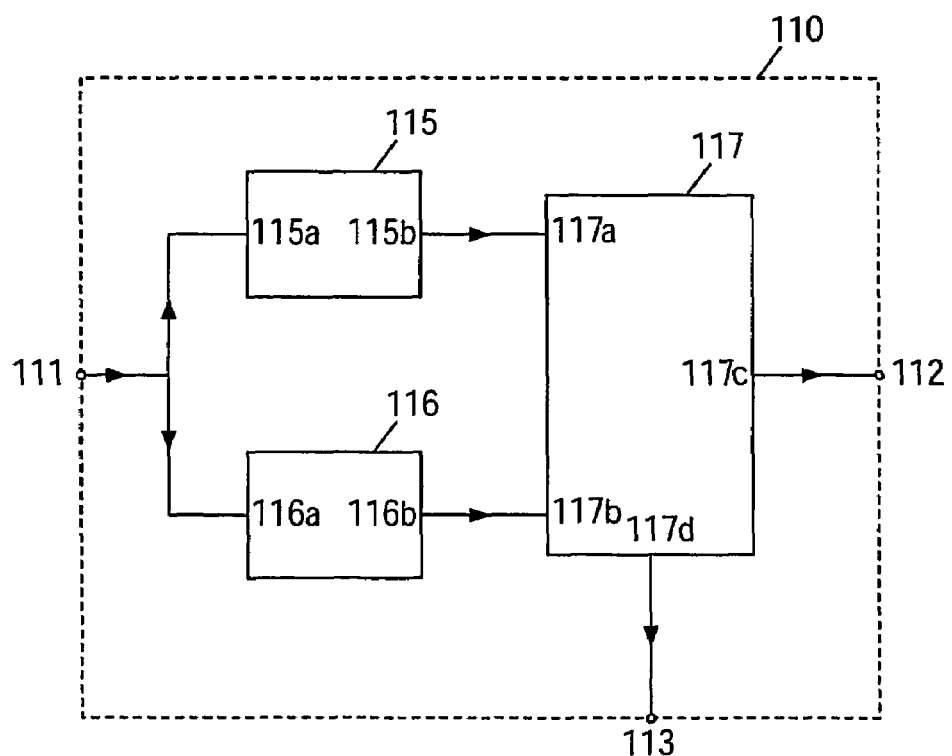
FIG. 6 is a block diagram illustrating an embodiment of a controllable filter.

FIG. 6 is a block diagram schematically illustrating a possible embodiment of a controllable filter device 110. In this embodiment, the controllable filter device 110 comprises two separate filters 115, 116. The first filter 115 is designed to pass signal components in the range of the wobble frequency and to stop signal components in the range of the data frequencies, whereas the second filter 116 is designed to stop signal components in the range of the wobble frequency and to pass signal components in the range of the data frequencies. For instance, the first filter 115 may be a band-pass filter centered at the wobble frequency, and the second filter 116 may be a high-pass filter, having its cut-off frequency set at a suitable value between the wobble frequency and the data frequencies.

Each filter 115, 116 has its input 115a, 116a coupled to the input 111 of the controllable filter device 110, and filter 115, 116 has its output 115b, 116b coupled to a respective input 117a, 117b of a controllable switch 117. The controllable switch 117 has an output 117c coupled to the output 112 of the controllable filter device 110. The controllable switch 117 has a control input 117d coupled to the control input 113 of the controllable filter device 110. The controllable switch 117 is responsive to the control signal received at its control input 117d to switch between a first operative state where its output 117c is connected to its first input 117a and a second operative state where its output 117c is connected to its second input 117b. Thus, depending on the operative state of the controllable switch 117, either the first filter 115 or the second filter 116 is active, which means that the controllable filter device 110 as a whole either shows the filter characteristics of the first filter or the filter characteristics of the second filter 116.

Figure 7:
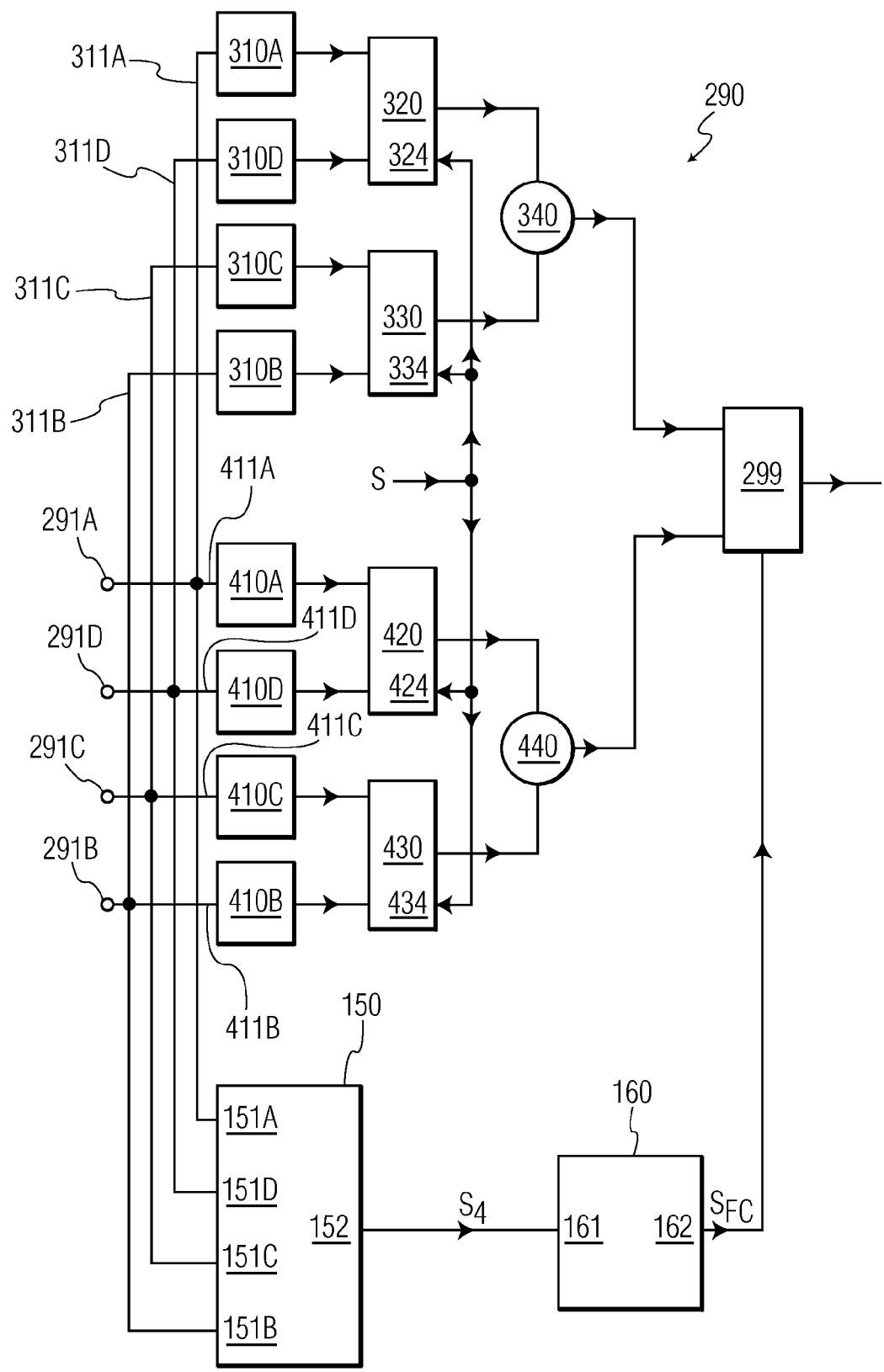
FIG. 7 is a block diagram illustrating an alternative embodiment of an adaptive signal processor.

FIG. 7 is a block diagram schematically illustrating an alternative embodiment of the control circuit, indicated at reference numeral 290. In this embodiment, the control circuit 290 comprises a first branch of filter devices 310A, 310B, 310C, 310D, delay detectors 320, 330, and adder 340, connected in a manner comparable to the circuit described above with reference to control circuit 90 (FIG. 4). These components may be identical to the components 110, 120, 130, 140 in the above-described embodiment of control circuit 90, with the exception that the filter devices 310A, 310B, 310C, 310D do not need to be controlled and therefore do not need to be controllable filter devices; in fact, these filter devices 310a to 310d may each be identical to the first filter 115 described above.

Further, in this embodiment, the control circuit 290 comprises a second branch of filter devices 410A, 410B, 410C, 410D, delay detectors 420, 430, and adder 440, connected in a manner comparable to the first branch. Likewise, these components may be identical to the components 110, 120, 130, 140 in the above-described embodiment of control circuit 90, with the exception that the filter devices 410a to 410d are not controlled and therefore do not need to be controllable filter device; in fact, these filter devices 410A, 410B, 410C, 410D may each be identical to the second filter 116 described above.

The filter devices 310A, 310B, 310C, 310D and the filter devices 410A, 410B, 410C, 410D have their respective inputs connected in parallel to the respective inputs 291A, 291B, 291C, 291D of the control circuit 290. Thus, the first adder 340 of the first branch provides the wobble-derived DTD4 signal, while the second adder 440 of the second branch provides the data-derived DTD4 signal.

The control circuit 290 further comprises a controllable switch 299, which has its two inputs coupled to the outputs of the adders 340 and 440, respectively, and which is controlled by the controller 160, to switch between a first operative state where its first input is connected to its output and a second operative state where its second input is connected to its output. So, in this embodiment, too, either the wobble-derived DTD4 signal or the data-derived DTD4 signal is used as tracking error signal.

While the above description clearly explains the principles of the present invention, in practice it may be advantageous to invert one of the signals of the signal pairs for which the delay Δ is calculated, which may result in an improved smoothness of the DTD4 signal in the range around $\phi=0$. Such inversion is equivalent to a delay of $\pi$. Thus, in a more general form, formula (5) can be written as:

$$DTD4R = \Delta(A, sB) + \Delta(C, sD) \quad (8)$$

wherein s is either +1 or −1.

In figures 4 and 7, this functionality is illustrated as a signal S, which is fed to sign inputs 124, 134, 324, 334, 424, 434 of the delay calculators 120, 130, 320, 330, 420, 430, respectively. This signal S may be equal to, or derived from, the output filter control signal $S_{FC}$ from the filter controller 160. In an embodiment, S equals +1 in the presence of data, and S equals −1 in the absence of data.

Figure 8:
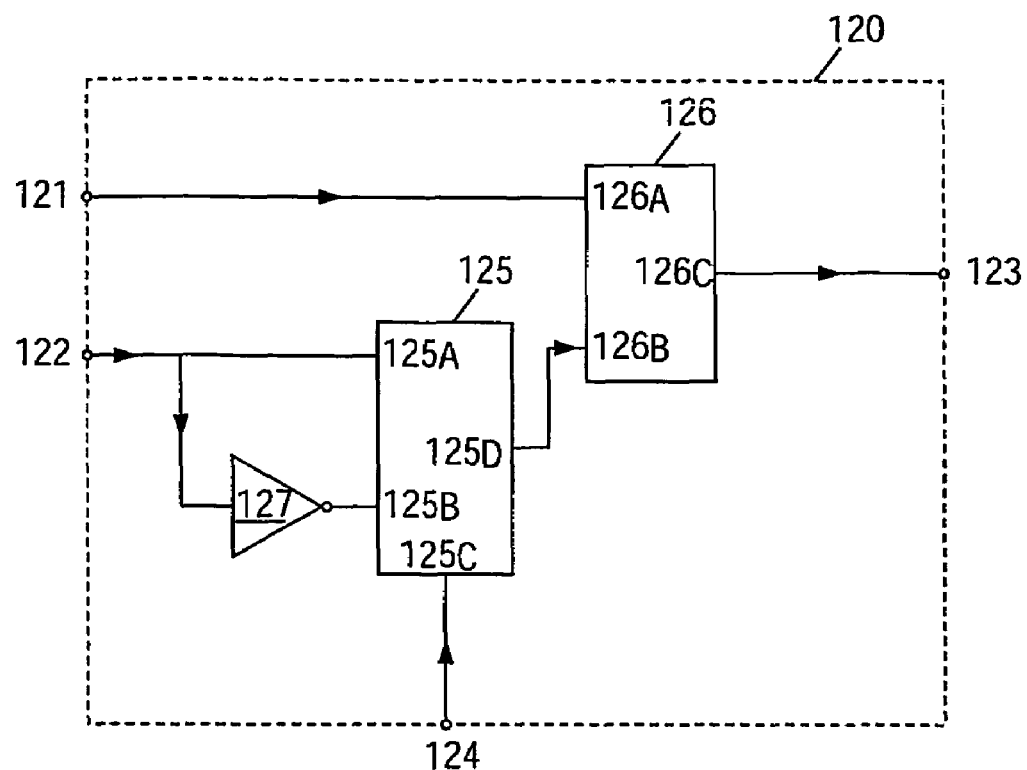
FIG. 8 is a block diagram illustrating an embodiment of a delay calculator.

FIG. 8 is a block diagram which schematically shows how this functionality can be implemented in a delay calculator, for example delay calculator 120. The delay calculator device 120 of this example comprises a controllable switch 125, having a first input 125a coupled to the second device input 122, a second input 125B, a control input 125C coupled to the device control input 124, and an output 125D. The delay calculator device 120 of this example further comprises an inverter 127, having its input coupled to the second device input 122 and having its output coupled to the second input 125B of the controllable switch 125. The controllable switch 125 is designed to connect its output 125D to either its first input 125A or its second input 125B, depending on the value of the signal received at its control input 125C.

The delay calculator device 120 of this example further comprises an actual delay calculating unit 126, having a first input 126A coupled to the first device input 121, a second input 126B coupled to the output 125d of the controllable switch 125, and an output 126C coupled to the device output 123, which actual delay calculating unit 126 is designed to calculate the delay between the signals arriving at its two inputs and generating an output signal representing this delay.

Thus, the present invention provides a method for radial tracking in an optical disc drive, wherein a DTD tracking error signal is derived from the wobble-induced signal components of the optical detector signal. This tracking error signal is relatively insensitive to beamlanding errors, and to differences in the signal amplitudes K of the output signal of individual detector segments. Further, the need for a 3-spot grating is eliminated.

In a preferred embodiment, a distinction is made between on the one hand a situation where the track being followed is empty and on the other hand a situation where the track being followed is written. In case the track being followed is empty, a DTD tracking error signal is derived from the wobble-induced signal components of the optical detector signal, whereas, in case the track being followed is written, a DTD tracking error signal is derived from the data-induced signal components of the optical detector signal.

It should be clear to a person skilled in the art that the present invention is not limited to the exemplary embodiments discussed above, but that various variations and modifications are possible within the protective scope of the invention as defined in the appending claims.

For instance, the filter controller may be designed to decide whether or not the current track contains data on the basis of another criterion.

Further, in the above, the present invention has been explained for a case where an optical detector 35 produces four output signals, corresponding to four detector segments, all four of these signals being used. However, it is also possible that the optical detector 35 has a different number of detector segments, hence produces a different number of output signals. It is also possible that the tracking error signal is derived from only some of the detector output signals.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, etc.

The invention claimed is:

1. An optical disc drive, comprising:
   an optical system for scanning an optical disc with a light beam, the optical system comprising an optical detector for receiving light reflected by the optical disc;

a radial actuator for radially displacing a focal spot of the light beam;

a control circuit having an input for receiving an output signal of said optical detector, and having an output for generating a control signal for said radial actuator;

wherein said control circuit is capable of operating in at least a first operating mode wherein said control signal for said radial actuator is generated on the basis of a tracking error signal derived from wobble-induced signal components of said optical detector output signal;

wherein said control circuit is capable of operating in at least a second operating mode wherein said control signal for said radial actuator is generated on the basis of a tracking error signal derived from data-induced signal components of said optical detector output signal;

wherein said control circuit is adapted to monitor said optical detector output signal, and to operate in said first operating mode when said optical detector output signal indicates an unwritten track, and to operate in said second operating mode when said optical detector output signal indicates a written track; and wherein said control circuit is adapted to monitor the signal power of low-frequency signal components of said optical detector output signal, and to switch to said first operating mode when said measured signal power shows an increase by more than a predetermined amount, for instance when the time-derivative of said measured signal power exceeds a predetermined positive reference level, and to operate in said second operating mode when said measured signal power shows a drop by more than a predetermined amount, for instance when the time-derivative of said measured signal power exceeds a predetermined negative reference level.

2. The optical disc drive according to claim 1, wherein said control circuit is capable of processing said optical detector output signal for calculating a tracking error signal depending on a delay between signal components.

3. The optical disc drive according to claim 1, wherein said optical detector is a four-segment detector.

4. The optical disc drive according to claim 1, wherein said control circuit has a first signal processing path for processing said optical detector output signal in said first operative mode, wherein said control circuit has a second signal processing path for processing said optical detector output signal in said second operative mode, and a controllable switch for selecting either said first signal processing path or said second signal processing path.

5. The optical disc drive according to claim 1, wherein said control circuit comprises an input filter assembly having a controllable filter characteristic.

6. The optical disc drive according to claim 5, wherein said input filter assembly comprises at least one controllable filter device having a signal input coupled to a optical detector input of the control circuit, having a signal output, and having a control input, the controllable filter device being designed to pass signal components in a low-frequency range and to block signal components in a data-frequency range in response to a control signal received at its control input having a first value, the controllable filter device being designed to block signal components in said low-frequency range and to pass signal components in said data-frequency range in response to said control signal received at its control input having a second value.

7. An optical disc drive, comprising:

an optical system for scanning an optical disc with a light beam, the optical system comprising an optical detector for receiving light reflected by the optical disc;

a radial actuator for radially displacing a focal spot of the light beam;

a control circuit having an input for receiving an output signal of said optical detector, and having an output for generating a control signal for said radial actuator;

wherein said control circuit is capable of operating in at least a first operating mode wherein said control signal for said radial actuator is generated on the basis of a tracking error signal derived from wobble-induced signal components of said optical detector output signal;

wherein said control circuit is capable of operating in at least a second operating mode wherein said control signal for said radial actuator is generated on the basis of a tracking error signal derived from data-induced signal components of said optical detector output signal;

wherein said control circuit is adapted to monitor said optical detector output signal, and to operate in said first operating mode when said optical detector output signal indicates an unwritten track, and to operate in said second operating mode when said optical detector output signal indicates a written track;

wherein said control circuit is adapted to monitor the signal power of data-frequency signal components of said optical detector output signal, to compare the measured signal power with a predetermined reference level, and to operate in said first operating mode when said measured signal power is below said reference level, and to operate in said second operating mode when said measured signal power is above said reference level; and wherein said control circuit is adapted to monitor the signal power of data-frequency signal components of said optical detector output signal, and to switch to said first operating mode when said measured signal power shows a drop by more than a predetermined amount, for instance when the time-derivative of said measured signal power exceeds a predetermined negative reference level, and to operate in said second operating mode when said measured signal power shows an increase by more than a predetermined amount, for instance when the time-derivative of said measured signal power exceeds a predetermined positive reference level.

8. An optical disc drive, comprising:

an optical system for scanning an optical disc with a light beam, the optical system comprising an optical detector for receiving light reflected by the optical disc;

a radial actuator for radially displacing a focal spot of the light beam;

a control circuit having an input for receiving an output signal of said optical detector, and having an output for generating a control signal for said radial actuator;

wherein said control circuit is capable of operating in at least a first operating mode wherein said control signal for said radial actuator is generated on the basis of a tracking error signal derived from wobble-induced signal components of said optical detector output signal;

wherein said control circuit is capable of operating in at least a second operating mode wherein said control signal for said radial actuator is generated on the basis of a tracking error signal derived from data-induced signal components of said optical detector output signal;

wherein said control circuit comprises an input filter assembly having a controllable filter characteristic;

wherein said input filter assembly comprises at least one controllable filter device having a signal input coupled to a optical detector input of the control circuit, having a signal output, and having a control input, the controllable filter device being designed to pass signal components in a low-frequency range and to block signal components in a data-frequency range in response to a control signal received at its control input having a first value, the controllable filter device being designed to block signal components in said low-frequency range and to pass signal components in said data-frequency range in response to said control signal received at its control input having a second value;

wherein said controllable filter device comprises:

a first filter having a filter characteristic passing signal components in said low-frequency range and blocking signal components in said data-frequency range, said first filter having a filter signal input coupled to the input of said filter device;

a second filter having a filter characteristic blocking signal components in said low-frequency range and passing signal components in said data-frequency range, said second filter having a filter signal input coupled to the input of said filter device;

a controllable switch having signal inputs coupled to filter signal outputs, respectively, having a signal output coupled to the output of said filter device, and having a control input coupled to the control input of said filter device);

wherein said controllable switch is adapted to couple its output to one of its inputs in response to a control signal received at its control input.

9. The optical disc drive according to claim 8, wherein said control circuit is adapted to monitor said optical detector output signal, and to operate in said first operating mode when said optical detector output signal indicates an unwritten track, and to operate in said second operating mode when said optical detector output signal indicates a written track.

10. The optical disc drive according to claim 9, wherein said control circuit is adapted to monitor the signal power of low-frequency signal components of said optical detector output signal, to compare the measured signal power with a predetermined reference level, and to operate in said first operating mode when said measured signal power is above said reference level, and to operate in said second operating mode when said measured signal power is below said reference level.

11. The optical disc drive according to claim 9, wherein said control circuit is adapted to monitor the signal power of data-frequency signal components of said optical detector output signal, to compare the measured signal power with a predetermined reference level, and to operate in said first operating mode when said measured signal power is below said reference level, and to operate in said second operating mode when said measured signal power is above said reference level.

12. An optical disc drive, comprising:

an optical system for scanning an optical disc with a light beam, the optical system comprising an optical detector for receiving light reflected by the optical disc;

a radial actuator for radially displacing a focal spot of the light beam;

a control circuit having an input for receiving an output signal of said optical detector, and having an output for generating a control signal for said radial actuator;

wherein said control circuit is capable of operating in at least a first operating mode wherein said control signal for said radial actuator is generated on the basis of a tracking error signal derived from wobble-induced signal components of said optical detector output signal;

wherein said control circuit is capable of operating in at least a second operating mode wherein said control signal for said radial actuator is generated on the basis of a tracking error signal derived from data-induced signal components of said optical detector output signal;

wherein said control circuit comprises an input filter assembly having a controllable filter characteristic;

wherein said input filter assembly comprises at least one controllable filter device having a signal input coupled to a optical detector input of the control circuit, having a signal output, and having a control input, the controllable filter device being designed to pass signal components in a low-frequency range and to block signal components in a data-frequency range in response to a control signal received at its control input having a first value, the controllable filter device being designed to block signal components in said low-frequency range and to pass signal components in said data-frequency range in response to said control signal received at its control input having a second value;

the optical disc drive further comprising a first delay calculator having:

a first input coupled to the output of a first controllable filter device having its signal input coupled to a first optical detector input of the control circuit for receiving the filtered optical output signal corresponding to the amount of light received at a first detector quadrant;

a second input coupled to the output of a fourth controllable filter device having its signal input coupled to a fourth optical detector input of the control circuit for receiving the filtered optical output signal corresponding to the amount of light received at a fourth detector quadrant;

a second delay calculator having:

a first input coupled to the output of a third controllable filter device having its signal input coupled to a third optical detector input of the control circuit for receiving the filtered optical output signal corresponding to the amount of light received at a third detector quadrant;

a second input coupled to the output of a second controllable filter device having its signal input coupled to a second optical detector input of the control circuit for receiving the filtered optical output signal corresponding to the amount of light received at a second detector quadrant;

the delay calculators each being designed to generate an output signal representing the time difference or phase difference of signals received at their inputs;

the control circuit further comprising an adder comprising two inputs coupled to outputs of said delay calculators, respectively, and an output providing the summation of said two input signals as tracking error signal).

* * * * *